United States Patent
Zhou et al.

(10) Patent No.: US 6,445,850 B1
(45) Date of Patent: Sep. 3, 2002

(54) METHOD AND APPARATUS FOR PER-BAND COMPENSATION WITH GAP-FREE BAND STRUCTURE FOR HIGH SPEED DWDM TRANSMISSION

(75) Inventors: Jianying Zhou, Acton; Richard A. Barry, Brookline; Murat Azizoglu, North Billerica; Derek Spock, Boston, all of MA (US); John Z. Jiang, Nashua, NH (US)

(73) Assignee: Sycamore Networks, Inc., Chelmsford, MA (US)

( * ) Notice: Subject to any disclaimer, the term of this patent is extended or adjusted under 35 U.S.C. 154(b) by 0 days.

(21) Appl. No.: 09/829,412

(22) Filed: Apr. 9, 2001

Related U.S. Application Data

(60) Provisional application No. 60/224,926, filed on Aug. 11, 2000.

(51) Int. Cl.[7] .................................................. G02B 6/28
(52) U.S. Cl. ......................................... 385/24; 359/124
(58) Field of Search ................................. 385/16–24, 31, 385/37, 147; 359/102, 108, 127, 124; 356/301

(56) References Cited

U.S. PATENT DOCUMENTS 5,245,404 A * 9/1993 Jannson et al. ............. 356/301
5,278,687 A * 1/1994 Jannson et al. ............. 359/124

OTHER PUBLICATIONS

Eight–channel 40 Gb/s RZ transmission over four 80 km spans (328 km) of NDSF with a net dispersion tolerance in excess of 180 ps/nm, Yanjun Zhu, et al., pp. TuD4–1/51—TuD4–3/53.

* cited by examiner

Primary Examiner—Akm E. Ullah
(74) Attorney, Agent, or Firm—Weingarten, Schurgin, Gagnebin & Lebovici LLP

(57) ABSTRACT

A high speed DWDM optical transmission system that reduces a fiber dispersion limit without reducing the total channel count of a multi-wavelength optical signal. The system achieves such reduction in the fiber dispersion limit by employing a multi-wavelength optical signal comprising a gap-free band structure, and performing per-band dispersion compensation on the optical signal by adjusting residual dispersion values associated with one or more of the bands. In one embodiment, the system includes a first dispersion compensation module (DCM) that provides a dispersion-compensated multi-wavelength optical signal containing wavelength-dependent residual dispersion to a band splitter. The band splitter separates the dispersion-compensated optical signal into a plurality of bands such that no band gaps are formed between adjacent bands, and provides each band to a respective second DCM configured to reduce the residual dispersion associated with that band to a predetermined range of residual dispersion values.

32 Claims, 8 Drawing Sheets

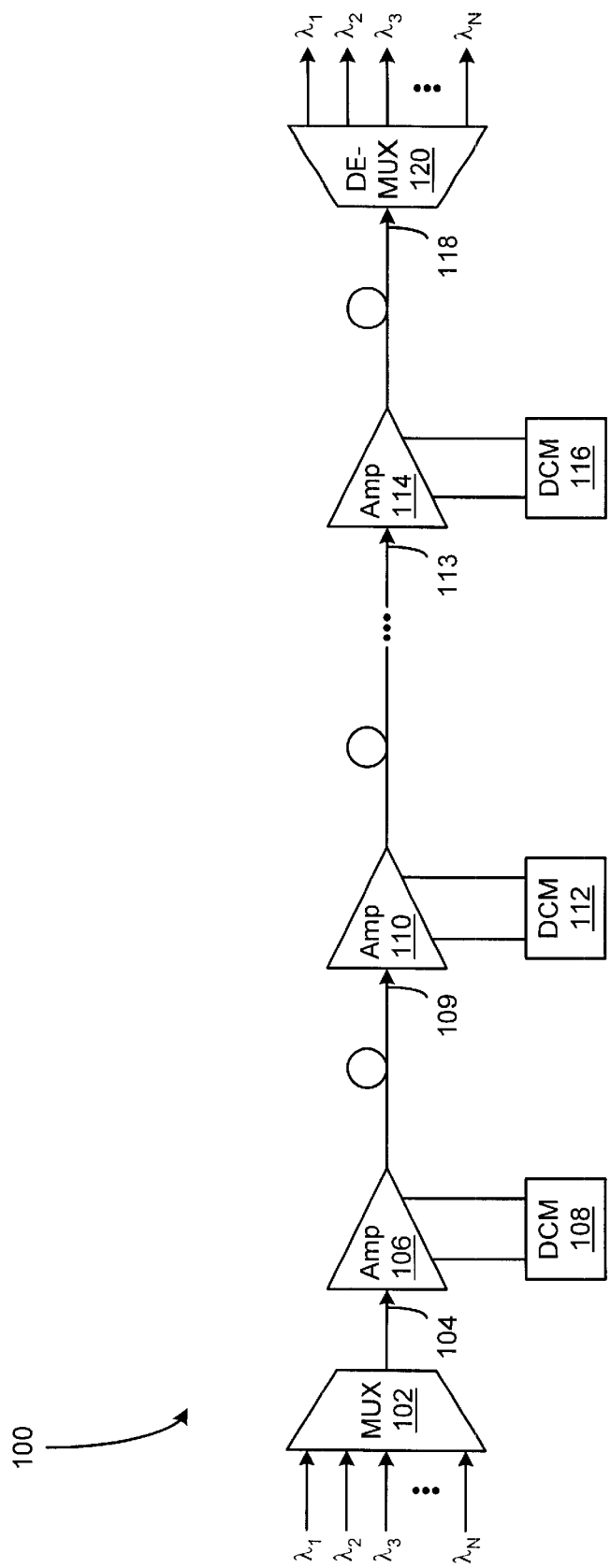
*Fig. 1 - Prior Art*

METHOD AND APPARATUS FOR PER-BAND COMPENSATION WITH GAP-FREE BAND STRUCTURE FOR HIGH SPEED DWDM TRANSMISSION

CROSS REFERENCE TO RELATED APPLICATIONS

This application claims priority of U.S. Provisional Patent Application No. 60/224,926 filed Aug. 11, 2000 entitled METHOD AND APPARATUS FOR PER-BAND COMPENSATION WITH GAP-FREE BAND STRUCTURE FOR HIGH SPEED DWDM TRANSMISSION.

STATEMENT REGARDING FEDERALLY SPONSORED RESEARCH OR DEVELOPMENT

N/A

BACKGROUND OF THE INVENTION

The present invention relates generally to the field of optical transmission systems, and more specifically to a dense wavelength division multiplexed optical transmission system configured to provide per-band dispersion compensation with gap-free band structures.

In recent years, Dense Wavelength Division Multiplexed (DWDM) optical transmission systems have been increasingly deployed in optical networks. Although DWDM optical transmission systems have increased the speed and capacity of optical networks, the performance of such systems, especially those providing bit rates of 10 Gb/s or more, has traditionally been limited by various factors such as optical fiber dispersion and the non-linearity in an optical fiber's refractive index, which can cause spectral broadening of optical pulses and degrade the transmission of high speed optical signals. Because such optical signal degradation tends to accumulate along transmission paths, fiber dispersion and non-linearity can significantly limit the transmission distance of high speed optical signals.

One approach to reducing the fiber dispersion limit and improving the performance of DWDM optical transmission systems is to install dispersion compensation fibers at intervals along a transmission path. For example, transmission fiber in the transmission path may have a positive dispersion shift that causes optical dispersion to accumulate along the path, and the installed dispersion compensation fibers may have a negative dispersion shift that allows the accumulated dispersion to return to zero or some nonzero value at a remote end of the transmission path.

However, this first approach has drawbacks in that both transmission fibers and dispersion compensation fibers generally have nonzero dispersion slopes. Different wavelengths included in a multi-wavelength optical signal may therefore be subject to different dispersion values in the transmission fibers and the dispersion compensation fibers. This can be problematic because the dispersion slope of a transmission fiber generally does not match that of a dispersion compensation fiber. As a result, although the accumulated dispersion may return to a desired value at the remote end of the transmission path for a particular wavelength, nonzero residual dispersion values detrimental to reliable optical transmissions may be evident for remaining wavelengths of the optical signal.

Moreover, in order to avoid a significant penalty or loss at the remote end of a transmission path, it is generally desirable to maintain residual dispersion values within a desired range of values. However, for high speed, multi-wavelength optical signals, the effects of fiber non-linearity, including self-phase modulation and/or cross-phase modulation, typically enhance the optical signal degradation caused by fiber dispersion, thereby making it difficult to keep residual dispersion within the desired range.

Another approach to reducing the fiber dispersion limit in DWDM optical transmission systems is to identify a plurality of spectral regions in multi-wavelength optical signals, and perform dispersion compensation on the respective spectral regions. Such an approach is employed in conventional "Red"-"Blue" bi-directional transmission systems. However, this second approach also has drawbacks in that there is typically a gap between, e.g., the Red and Blue spectral regions that reduces the total channel count of the optical signal.

Still another approach is to filter multi-wavelength optical signals using conventional cascaded band filters before performing dispersion compensation on the filtered bands. However, gaps are generally required in this third approach to avoid a penalty or loss resulting from, e.g., isolation, polarization dependent loss, or polarization mode dispersion in the optical signal pass-band. As a result, this third approach also tends to reduce the total channel count of the multi-wavelength optical signal.

It would therefore be desirable to have a high speed DWDM optical transmission system that is capable of carrying multi-wavelength optical signals at bit rates up to 10 Gb/s or more. Such a DWDM optical transmission system would be configured to reduce a fiber dispersion limit without reducing the total channel count of a multi-wavelength optical signal.

BRIEF SUMMARY OF THE INVENTION

In accordance with the present invention, a high speed DWDM optical transmission system is provided that reduces a fiber dispersion limit without reducing the total channel count of a multi-wavelength optical signal. The DWDM optical transmission system achieves such reduction in the fiber dispersion limit by employing a multi-wavelength optical signal comprising a gap-free band structure, and performing per-band dispersion compensation on the optical signal by adjusting residual dispersion values associated with one or more of the bands.

In one embodiment, per-band dispersion compensation of a multi-wavelength optical signal is provided by line terminating and/or regenerating apparatus at optical signal receiving sites of the DWDM optical transmission system. Each line terminating and/or regenerating apparatus comprises at least one band splitter, a plurality of fixed or tunable Dispersion Compensation Modules (DCM), and a plurality of optical de-multiplexors. A first DCM receives a multi-wavelength optical signal carried on a transmission fiber, and provides a dispersion-compensated multi-wavelength optical signal containing wavelength-dependent residual dispersion to the band splitter. The residual dispersion associated with the multi-wavelength optical signal is caused by the respective nonzero dispersion slopes of the transmission fiber and the first DCM. The band splitter separates the dispersion-compensated multi-wavelength optical signal into a plurality of bands such that no band gaps are formed between adjacent bands. In a preferred embodiment, the band splitter includes a 50/50 optical coupler configured to couple the optical signal to a first optical signal path and a second optical signal path, in which the first and second paths include respective pluralities of band filters. The plurality of band filters in the first path is configured to provide a first group of "odd" bands, and the plurality of band filters in the second path is configured to provide a second group of "even" bands. The band splitter provides each band in the odd and even groups of bands to a respective second DCM configured to reduce the residual dispersion associated with that band to a predetermined range of residual dispersion values. The second DCM's provide the dispersion-compensated bands to respective optical de-multiplexors configured to separate the bands into their component wavelengths for subsequent processing.

Per-band dispersion compensation of a multi-wavelength optical signal is also provided at mid-points of optical signal paths by all-optical regenerating apparatus included in the DWDM optical transmission system. Each all-optical regenerating apparatus comprises at least one band splitter, a plurality of fixed or tunable Dispersion Compensation Modules (DCM), and at least one optical multiplexor. A first DCM receives a multi-wavelength optical signal carried on a transmission fiber, and provides a dispersion-compensated multi-wavelength optical signal containing wavelength-dependent residual dispersion to the band splitter. The band splitter separates the dispersion-compensated multi-wavelength optical signal into a plurality of odd and even groups of bands such that no band gaps are formed between adjacent bands. The band splitter provides each band in the odd and even groups of bands to a respective second DCM configured to reduce the residual dispersion associated with that band to a predetermined range of residual dispersion values. The second DCM's provide the dispersion-compensated bands to at least one optical multiplexor configured to re-combine the bands to form a multi-wavelength optical signal for subsequent transmission. In a preferred embodiment, the optical multiplexor is configured to provide sufficient isolation to eliminate cross-talk between adjacent/non-adjacent bands.

In another embodiment, per-band dispersion compensation of a multi-wavelength optical signal is provided by transmitting apparatus included in the DWDM optical transmission system. Each transmitting apparatus comprises at least one band combiner, a plurality of optical multiplexors, and a plurality of DCM's. Each optical multiplexor is configured to multiplex individual wavelengths into a respective band, and the respective bands are combined into a multi-wavelength optical signal by the band combiner. A respective DCM is disposed between each optical multiplexor and the band combiner to compensate dispersion contained in the respective bands.

In still another embodiment, per-band dispersion compensation of a multi-wavelength optical signal is provided by optical add/drop apparatus included in the DWDM optical transmission system. Each optical add/drop apparatus comprises at least one pre-amplifier, at least one post-amplifier, at least one first optical add/drop device configured to provide respective wavelengths that are dropped from the optical signal ("dropped traffic"), at least one second optical add/drop device configured to receive respective wavelengths that are to be added to the optical signal ("added traffic"), and a plurality of fixed or tunable DCM's. A first DCM is coupled to the input of the first optical add/drop device handling the dropped traffic, and a second DCM is coupled to the output of the second optical add/drop device handling the added traffic. The pre-amplifier receives a respective band of a multi-wavelength optical signal containing wavelength-dependent residual dispersion; and, provides an amplified representation of the band to the first DCM, which is configured to reduce the residual dispersion in the band to a predetermined range of residual dispersion values. The first DCM then provides the dispersion-compensated band to the first optical add/drop device, which provides the dropped traffic on a first optical signal path and remaining traffic to the second optical add/drop device. Next, the second optical add/drop device receives the added traffic on a second optical signal path, and provides a combination of the traffic provided by the first optical add/drop device and the added traffic to the second DCM. Like the first DCM, the second DCM is configured to reduce the residual dispersion in the combined traffic to a predetermined range of residual dispersion values. The second DCM then provides compensated traffic to the post-amplifier, which compensates for losses introduced by the first and second DCM's and the first and second optical add/drop devices.

By providing per-band dispersion compensation with gap-free band structures at optical signal receiving sites, mid-points of optical signal paths, optical signal transmitting sites, and/or optical add/drop sites of a DWDM optical transmission system, fiber dispersion limits can be reduced or eliminated without reducing the total channel count of a multi-wavelength optical signal. In this way, transmission performances in high speed (i.e., 10 Gb/s or more) DWDM optical transmission systems can be improved.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which:

FIG. 1 is a block diagram depicting a line terminating/regenerating apparatus configured to provide dispersion compensation at an optical signal receiving site of a conventional DWDM optical transmission system;

FIG. 2b is a block diagram depicting a band splitter included in the line terminating/regenerating apparatus of FIG. 2a;

FIG. 2e is a diagram depicting the results of per-band dispersion compensation using the line terminating apparatus of FIG. 2a;

DETAILED DESCRIPTION OF THE INVENTION

Figure 2A:
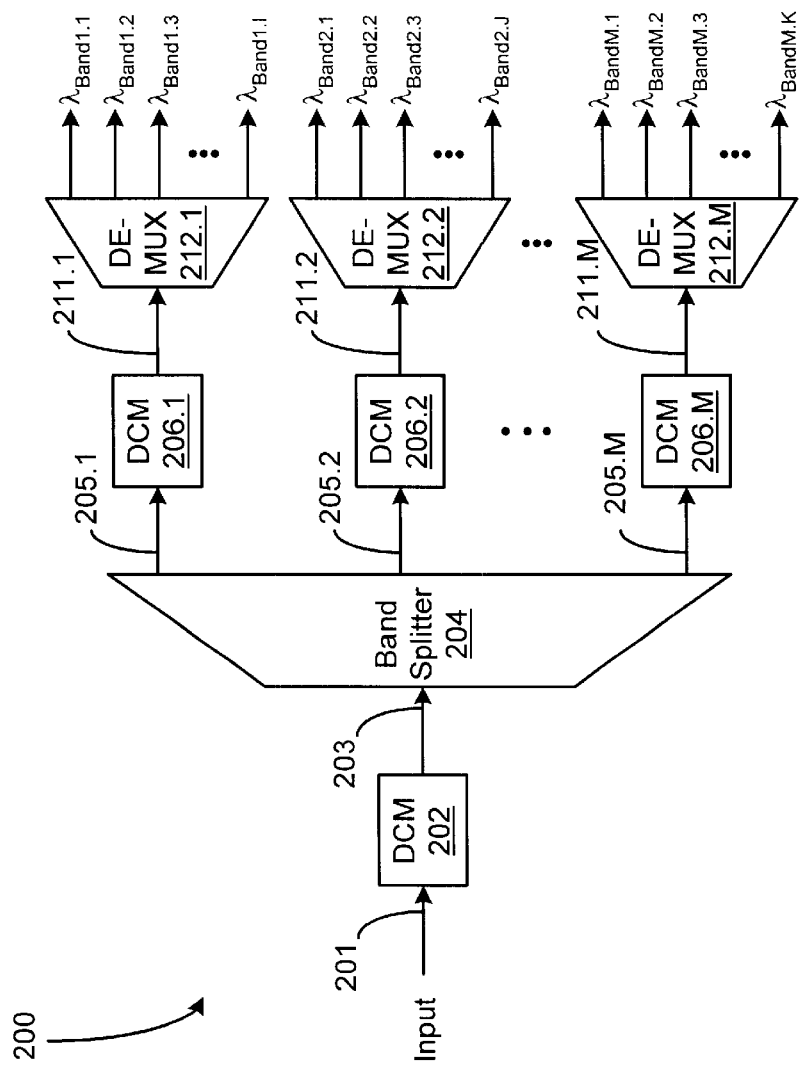
FIG. 2a is a block diagram depicting a line terminating/regenerating apparatus configured to provide per-band dispersion compensation with gap-free band structures at an optical signal receiving site of a high speed DWDM optical transmission system, in accordance with the present invention.

The entire disclosure of U.S. Provisional Patent Application No. 60/224,926 filed Aug. 11, 2000 is incorporated herein by reference.

Methods and apparatus are disclosed for performing per-band dispersion compensation with gap-free band structures in an optical transmission system. Such per-band dispersion compensation can be provided at line terminating sites, regenerating sites, mid-points of optical signal paths, and/or optical add/drop sites of a high speed Dense Wavelength Division Multiplexed (DWDM) optical transmission system. By performing per-band dispersion compensation with gap-free band structures, a fiber dispersion limit in the high speed DWDM optical transmission system can be reduced or eliminated without reducing the total channel count of a multi-wavelength optical signal.

FIG. 1 depicts a block diagram of a line terminating/regenerating apparatus 100 for providing dispersion compensation at an optical signal receiving site of a conventional DWDM optical transmission system. The line terminating/regenerating apparatus 100 is configured to compensate for fiber dispersion and non-linearity associated with a transmission path capable of carrying a multi-wavelength optical signal.

Those of ordinary skill in the art will appreciate that fiber dispersion and non-linearity can significantly degrade the transmission of high speed multi-wavelength optical signals, particularly, multi-wavelength optical signals transmitted at bit rates of 10 Gb/s or more. For example, such signal degradation can take the form of spectral broadening of optical pulses transmitted through a high speed DWDM optical transmission system. Further, because such optical signal degradation can accumulate along a transmission path, fiber dispersion and non-linearity can significantly limit the transmission distance of high speed optical signals between, e.g., line terminating and regenerating equipment in a DWDM optical transmission system.

The line terminating/regenerating apparatus 100 comprises a transmission path including an optical multiplexor 102 configured to receive a plurality of wavelengths $\lambda_1$–$\lambda_N$, and provide a multi-wavelength optical signal comprising the component wavelengths $\lambda_1$–$\lambda_N$ to a transmission fiber 104. Because optical dispersion (also known as chromatic dispersion) can accumulate along the transmission fiber 104, the multi-wavelength optical signal is provided to a first optical amplifier 106 operatively coupled to a DCM 108. The combination of the first optical amplifier 106 and the DCM 108 is configured to compensate for losses introduced by the transmission fiber 104, and return accumulated dispersion at the end of the transmission fiber 104 to zero or a desired nonzero value.

Similarly, the multi-wavelength optical signal is successively provided, by way of transmission fibers 109 and 113, to at least one second optical amplifier 110 operatively coupled to a DCM 112, and a third optical amplifier 114 operatively coupled to a DCM 116. It is noted that the respective combinations of the first optical amplifier 106 and the DCM 108, and the second optical amplifier 110 and the DCM 112, provide, at least in part, functions of regenerating equipment in the conventional DWDM optical transmission system 100. Further, the combination of the third optical amplifier 114 and the DCM 116 provides, at least in part, functions of line terminating equipment in the conventional DWDM optical transmission system 100.

Moreover, like the combination of the first optical amplifier 106 and the DCM 108, the respective combinations of the second optical amplifier 110 and the DCM 112, and the third optical amplifier 114 and the DCM 116, are configured to compensate for losses introduced by the transmission fibers 109 and 113, and return accumulated dispersion at the end of the transmission fibers 109 and 113 to zero or a desired nonzero value.

The transmission path of the conventional N-wave DWDM optical transmission system 100 further includes an optical de-multiplexor 120 configured to receive the multi-wavelength optical signal from the third optical amplifier 114 via a transmission fiber 118, and separate the optical signal into its component wavelengths $\lambda_1$–$\lambda_N$ for subsequent processing.

The first, second, and third optical amplifiers 106, 110, and 114 typically comprise respective Erbium Doped Fiber Amplifiers (EDFA's); and, the DCM's 108, 112, and 116 typically comprise respective dispersion compensation fibers. Further, the transmission fibers 104, 109, 113, and 118 typically comprise respective single mode optical transmission fibers.

It is noted that the transmission fibers 104, 109, 113, and 118, and the dispersion compensation fibers of the DCM's 108, 112, and 116, typically have respective nonzero dispersion slopes. This means that the component wavelengths $\lambda_1$–$\lambda_N$ of the multi-wavelength optical signal carried by the conventional DWDM optical transmission system 100 may be subject to different dispersion values in the transmission fibers 104, 109, 113, and 118 and the dispersion compensation fibers.

As a result, even though the conventional optical transmission system 100 may allow accumulated dispersion to return to a desired value at a remote end of the transmission path for a particular wavelength of the multi-wavelength optical signal, nonzero residual dispersion values detrimental to reliable optical transmissions may accumulate for remaining wavelengths of the optical signal. It is noted that such dispersion accumulated along a transmission path of an optical transmission system can significantly limit the transmission distance of high speed optical signals between, e.g., line terminating and regenerating equipment employed in the system.

FIG. 2a depicts a block diagram of an illustrative embodiment of a line terminating/regenerating apparatus 200 configured to provide per-band dispersion compensation with gap-free band structures at an optical signal receiving site of a high speed DWDM optical transmission system, in accordance with the present invention. For example, the line terminating/regenerating apparatus 200 may be included in a high speed DWDM optical transmission system capable of carrying multi-wavelength optical signals at bit rates up to 10 Gb/s or more per wavelength. The apparatus 200 provides for a reduced fiber dispersion limit in a high speed DWDM optical transmission system by performing per-band dispersion compensation on a multi-wavelength optical signal having a gap-free band structure. Such reduction in the fiber dispersion limit is achieved without reducing the total channel count of the multi-wavelength optical signal.

The line terminating/regenerating apparatus 200 includes a DCM 202 configured to receive a multi-wavelength optical input signal by way of a transmission fiber 201, and provide a dispersion-compensated optical signal to a transmission fiber 203.

It is understood that the transmission fiber 201 may be part of a transmission path capable of carrying high speed multi-wavelength optical signals through at least a portion of the DWDM optical transmission system. Further, the transmission path including the transmission fiber 201 may have a positive dispersion shift resulting from, e.g., fiber dispersion and non-linearity that causes optical dispersion to accumulate along the transmission path. Accordingly, the DCM 202 is configured to compensate for the effects of such accumulated dispersion caused by fiber dispersion and non-linearity in the optical input signal.

In one embodiment, the DCM 202 may cause a negative dispersion shift that allows the dispersion accumulated along the transmission path to return to zero or a predetermined value for at least one component wavelength of the input optical signal. For example, the DCM 202 may comprise a dispersion compensation fiber, a fiber Bragg grating, or any other device capable of compensating accumulated dispersion caused by, e.g., fiber dispersion and non-linearity.

It is noted that the transmission path including the transmission fiber 201, and the DCM 202 may have respective nonzero dispersion slopes. This means that component wavelengths of input optical signals provided to the line terminating apparatus 200 may be subject to different dispersion values in the transmission path and the DCM 202, thereby causing different amounts of residual dispersion to accumulate for at least some of the component wavelengths of the optical signal provided to the transmission fiber 203.

Figure 2B:
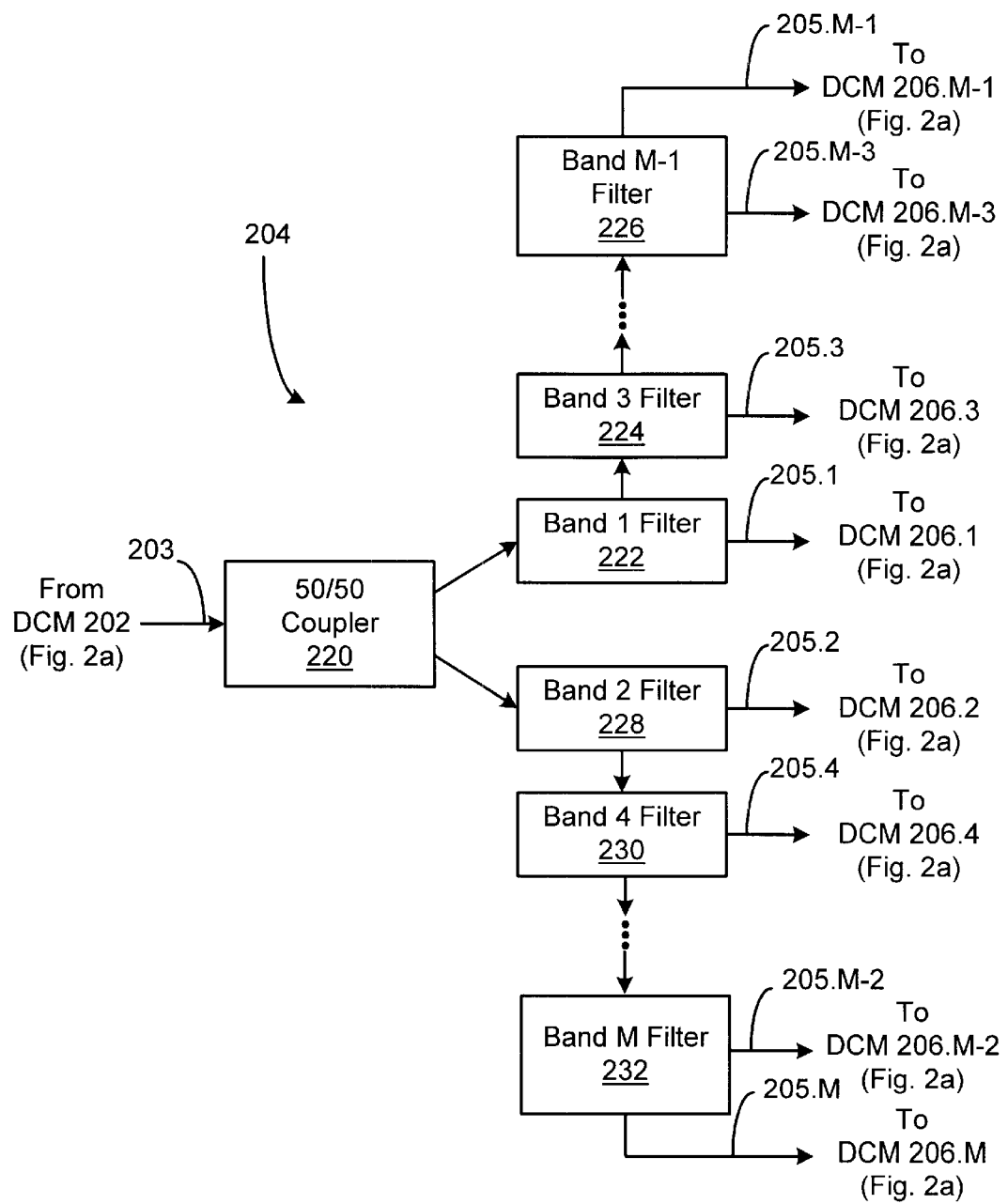
Figure 2C:
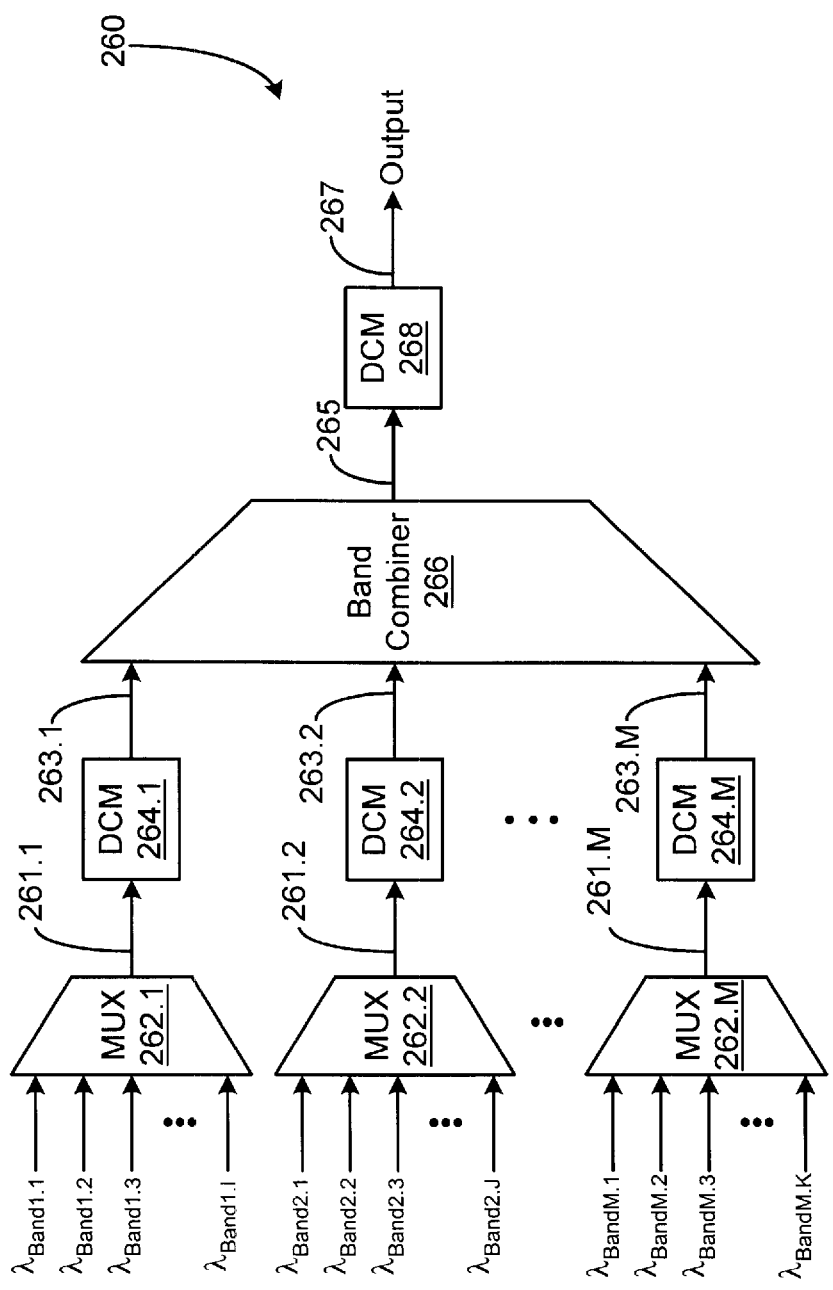
FIG. 2c is a block diagram depicting a line terminating apparatus configured to provide per-band dispersion compensation with gap-free band structures at an optical signal transmitting site of a high speed DWDM optical transmission system, in accordance with the present invention.
Figure 2D:
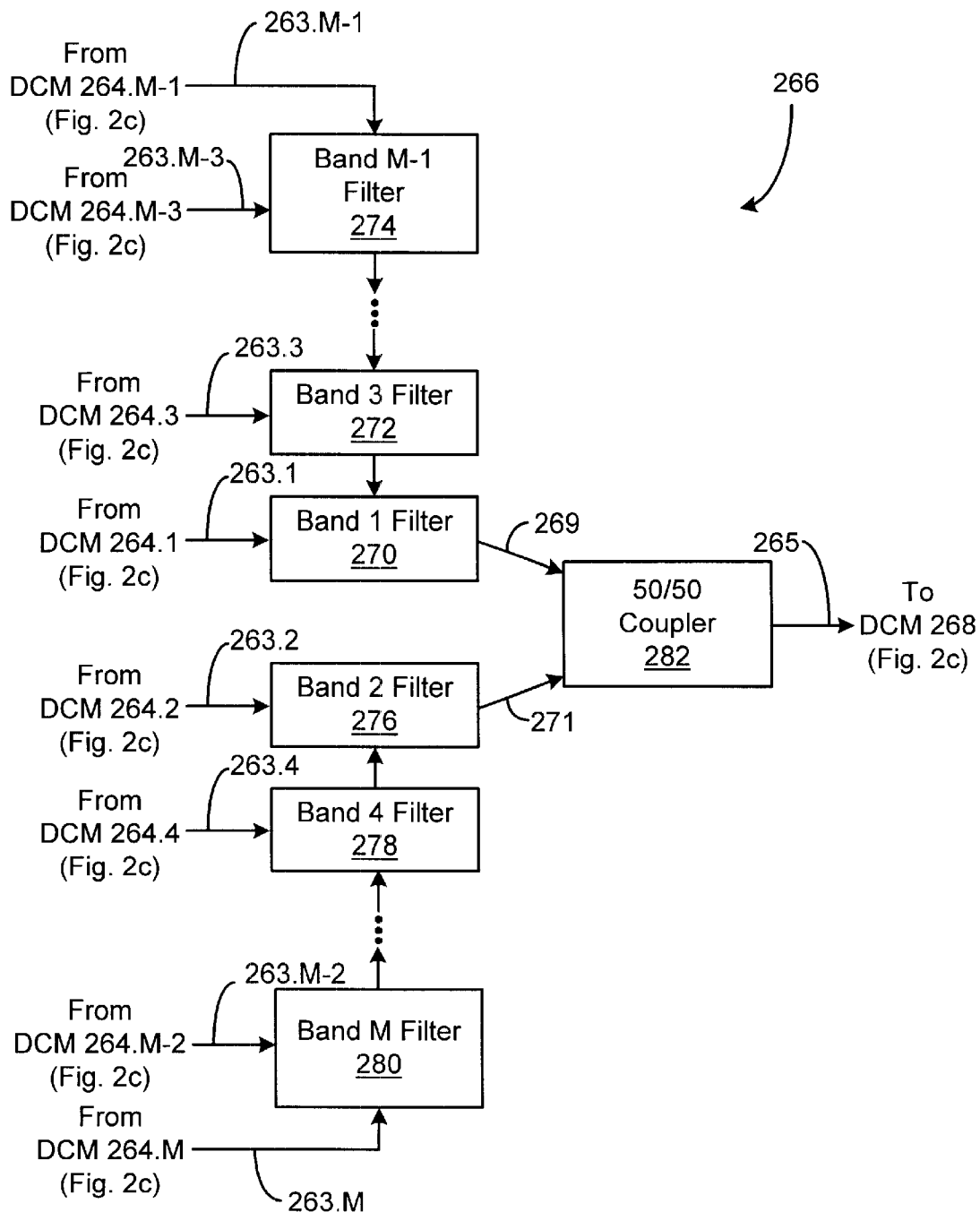
FIG. 2d is a block diagram depicting a band combiner included in the line terminating apparatus of FIG. 2c.
Figure 2E:
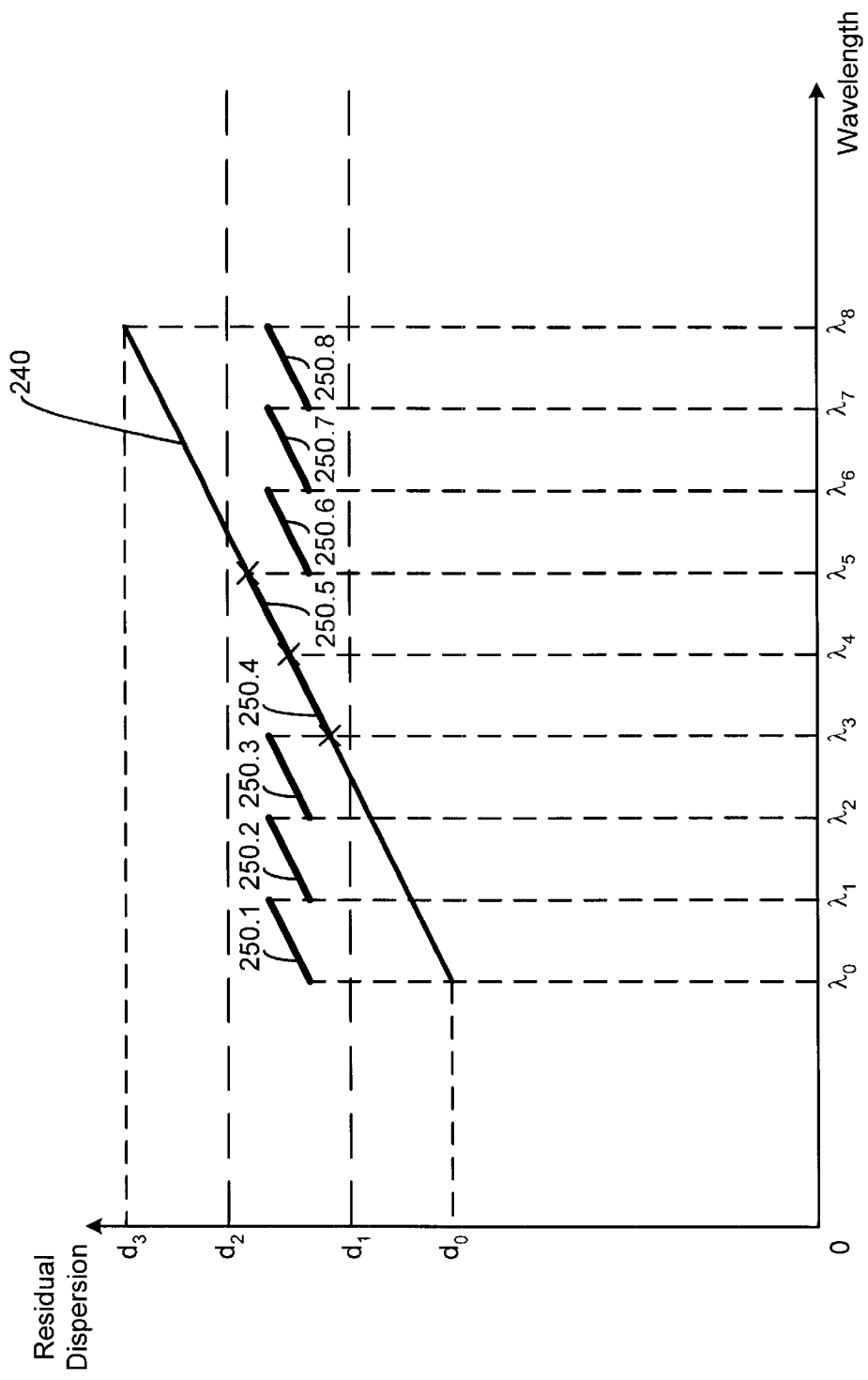

For example, FIG. 2e depicts an exemplary graphical representation of residual dispersion 240 that may accumulate for wavelengths of a multi-wavelength optical input signal provided to the transmission fiber 203 (see FIG. 2a). Because optical dispersion is generally a linear phenomenon, the wavelength-dependent residual dispersion 240 is depicted in FIG. 2e by a line with a nonzero slope. Specifically, the wavelength-dependent residual dispersion 240 ranges from a value $d_0$ for a wavelength $\lambda_0$ to a value $d_3$ for a wavelength $\lambda_8$.

The multi-wavelength optical input signal containing the wavelength-dependent residual dispersion 240 is provided to a band splitter 204 (see FIG. 2a) configured to separate the optical input signal into a plurality of its component bands such that no band gaps are formed between adjacent bands. The band splitter 204 provides the respective component bands to corresponding transmission fibers 205.1–205.M.

As described above, the band splitter 204 provides a plurality of component bands of the optical input signal with no band gaps between adjacent bands. In one embodiment, the band splitter 204 eliminates band gaps between the adjacent bands of the optical input signal by employing at least one optical coupler and a plurality of band filters.

FIG. 2b depicts a block diagram of an illustrative embodiment of the band splitter 204, which comprises a 50/50 optical coupler 220 and band filters 222, 224, 226, 228, 230, and 232. Specifically, the 50/50 optical coupler 220 is configured to receive the optical signal containing the residual dispersion 240 on the transmission fiber 203, and couple the optical signal to a first transmission path comprising band filters 222, 224, and 226, and a second transmission path comprising band filters 228, 230, and 232.

In one embodiment, the band 1 filter 222, the band 3 filter 224, and the band M-1 filter 226 in the first transmission path are configured to provide a first group of "odd" component bands on respective transmission fibers 205.1, 205.3, 205.M-3, and 205.M-1; and, the band 2 filter 228, the band 4 filter 230, and the band M filter 232 in the second transmission path are configured to provide a second group of "even" component bands on respective transmission fibers 205.2, 205.4, 205.M-2, and 205.M. In a preferred embodiment, the band filters included in the band splitter 204 are configured to provide low insertion loss and good uniformity across the component bands 1–M.

The band splitter 204 provides the component bands 1–M to respective DCM's 206.1–206.M by way of the transmission fibers 205.1–205.M (see FIG. 2a). The respective DCM's 206.1–206.M are configured to provide per-band dispersion compensation of the component bands 1–M, thereby compensating the residual dispersion caused, at least in part, by the nonzero dispersion slopes of the transmission path (which includes the transmission fiber 201) and the DCM 202. For example, the DCM's 206.1–206.M may comprise respective dispersion compensation fibers, fiber Bragg gratings, or any other device capable of compensating residual dispersion caused by nonzero dispersion slopes. In a preferred embodiment, the DCM's 206.1–206.M are adjustable to provide desired levels of dispersion compensation.

In order to achieve optimum transmission performance in a high speed DWDM optical transmission system, it is generally desirable to maintain residual dispersion values within a predetermined target window. FIG. 2e shows an exemplary target window for residual dispersion values ranging from $d_1$ to $d_2$, which in the illustrated embodiment may span approximately 500 ps/nm. As shown in FIG. 2e, the residual dispersion 240 associated with upper and lower component wavelengths of the optical signal carried by the transmission fiber 203 fall outside the exemplary target window. For example, the residual dispersion 240 associated with the wavelengths $\lambda_0$–$\lambda_8$ ranges from $d_0$ to $d_3$, which in the illustrated embodiment may span approximately 900 ps/nm.

According to the present invention, residual dispersion values are maintained within the predetermined target window by suitably adjusting the DCM's 206.1–206.M to compensate the residual dispersion contained in the bands 1–M.

FIG. 2e depicts exemplary graphical representations of residual dispersion 250.1–250.8 associated with exemplary bands 1–8 after adjusting the DCM's 206.1–206.M to compensate the residual dispersion contained in the bands. For example, the band 1 filter 222 (see FIG. 2b) may provide an optical signal comprising exemplary band 1 ($\lambda_0$–$\lambda_1$) to the DCM 206.1 that contains an amount of residual dispersion represented by the residual dispersion 240 associated with wavelengths ranging from $\lambda_0$ up to and including $\lambda_1$. As shown in FIG. 2e, that portion of the residual dispersion 240 falls outside the predetermined target window (which in the illustrated embodiment ranges from $d_1$ to $d_2$).

By suitably adjusting the DCM 206.1, the DCM 206.1 can be configured to provide a dispersion-compensated band 1 containing an amount of residual dispersion represented by the wavelength-dependent residual dispersion 250.1, which falls within the predetermined target window. The DCM's 206.2, 206.3, and 206.6–206.8 may be similarly adjusted to provide dispersion-compensated bands 2, 3, and 6–8 that contain respective amounts of residual dispersion represented by the wavelength-dependent residual dispersion 250.2, 250.3, and 250.6–250.8, which also fall within the predetermined target window.

It is noted that the band 4 filter 230 (see FIG. 2b) and the band 5 filter (not shown) provide respective optical signals comprising amounts of residual dispersion associated with wavelengths ranging from $\lambda_3$ up to and including $\lambda_5$ that fall within the predetermined target window (see FIG. 2e depicting that portion of the residual dispersion 240 corresponding to wavelengths $\lambda_3$–$\lambda_5$). Accordingly, for the illustrated embodiment, the DCM's 206.4 and 206.5 coupled to the respective band 4 and band 5 filters need not be adjusted to provide additional dispersion compensation beyond that provided by the DCM 202 (see FIG. 2a).

It should also be noted that for the illustrated embodiment, there are no band gaps between the bands 1–8. Accordingly, the DCM's 206.1–206.M may be adjusted to compensate the residual dispersion contained in the bands 1–8, on a per-band basis, without reducing the total channel count of the optical input signal.

As shown in FIG. 2a, the DCM's 206.1–206.M provide the dispersion-compensated bands 1–M to respective optical de-multiplexors 212.1–212.M by way of transmission fibers 211.1–211.M. The respective demultiplexors 212.1–212.M are configured to receive the bands 1–M, and separate the bands 1–M into their component wavelengths for subsequent processing.

For example, the de-multiplexor 212.1 separates the band 1 into its component wavelengths $\lambda_{Band1.1}$–$\lambda_{Band1.I}$, the de-multiplexor 212.2 separates the band 2 into its component wavelengths $\lambda_{Band2.1}$–$\lambda_{Band2.J}$, and the de-multiplexor 212.M separates the band M into its component wavelengths $\lambda_{BandM.1}$–$\lambda_{BandM.K}$.

FIG. 2c depicts a block diagram of an illustrative embodiment of a line terminating apparatus 260 configured to provide per-band dispersion compensation with gap-free band structures at an optical signal transmitting site of a high speed DWDM optical transmission system, in accordance with the present invention. The line terminating apparatus 260 includes a plurality of optical multiplexors 262.1–262.M configured to receive, e.g., the component wavelengths $\lambda_{Band1.1}$–$\lambda_{Band1.I}$ of band 1, the component wavelengths $\lambda_{Band2.1}$–$\lambda_{Band2.J}$ of band 2, through the component wavelengths $\lambda_{BandM.1}$–$\lambda_{BandM.K}$ of band M, respectively; multiplex the component wavelengths $\lambda_{Band1.1}$–$\lambda_{Band1.I}$, $\lambda_{Band2.1}$–$\lambda_{Band2.J}$, through $\lambda_{BandM.1}$–$\lambda_{BandM.K}$ into the respective bands 1–M; and, provide the bands 1–M to the respective transmission fibers 261.1–261.M.

The line terminating apparatus 260 further includes a plurality of DCM's 264.1–264.M and a band combiner 266. The plurality of DCM's 264.1–264.M are configured to receive the respective bands 1–M by way of the transmission fibers 261.1–261.M, and provide dispersion-compensated bands 1–M to the band combiner 266 by way of transmission fibers 263.1–263.M. The band combiner 266 is configured to combine the respective bands 1–M into a multi-wavelength optical signal, and provide the multi-wavelength optical signal to a transmission fiber 265.

FIG. 2d depicts a block diagram of an illustrative embodiment of the band combiner 266, which comprises band filters 270, 272, 274, 276, 278, and 280; and, a 50/50 optical coupler 282. In one embodiment, the band 1 filter 270, the band 3 filter 272, and the band M-1 filter 274 in a first transmission path are configured to receive a first group of "odd" component bands on the respective transmission fibers 264.1, 264.3, 264.M-3, and 264.M-1; and, the band 2 filter 276, the band 4 filter 278, and the band M filter 280 in a second transmission path are configured to receive a second group of "even" component bands on the respective transmission fibers 264.2, 264.4, 264.M-2, and 264.M. Like the band filters 222, 224, 226, 228, 230, and 232 (see FIG. 2b), the band filters 270, 272, 274, 276, 278, and 280 included in the band combiner 266 are configured to provide low insertion loss and good uniformity across the component bands 1–M.

The band filters 270, 272, and 274 provide the filtered first group of odd component bands to the 50/50 optical coupler 282 by way of a transmission fiber 269; and, the band filters 276, 278, and 280 provide the filtered second group of even component bands to the 50/50 optical coupler 282 by way of a transmission fiber 271. The 50/50 optical coupler 282 is configured to couple a multi-wavelength optical signal comprising a combination of the odd and even component bands to the transmission fiber 265.

The band combiner 266 provides the multi-wavelength optical signal comprising the combined component bands 1–M to a DCM 268 (see FIG. 2c) by way of the transmission fiber 265. The DCM 268 is configured to provide a dispersion-compensated multi-wavelength optical signal to a transmission fiber 267 for subsequent transmission.

For example, the DCM's 264.1–264.M and 268 may comprise respective dispersion compensation fibers, fiber Bragg gratings, or any other device capable of compensating fiber dispersion and non-linearity. In a preferred embodiment, the DCM's 264.1–264.M and 268 are adjustable to provide desired levels of dispersion compensation.

Figure 3:
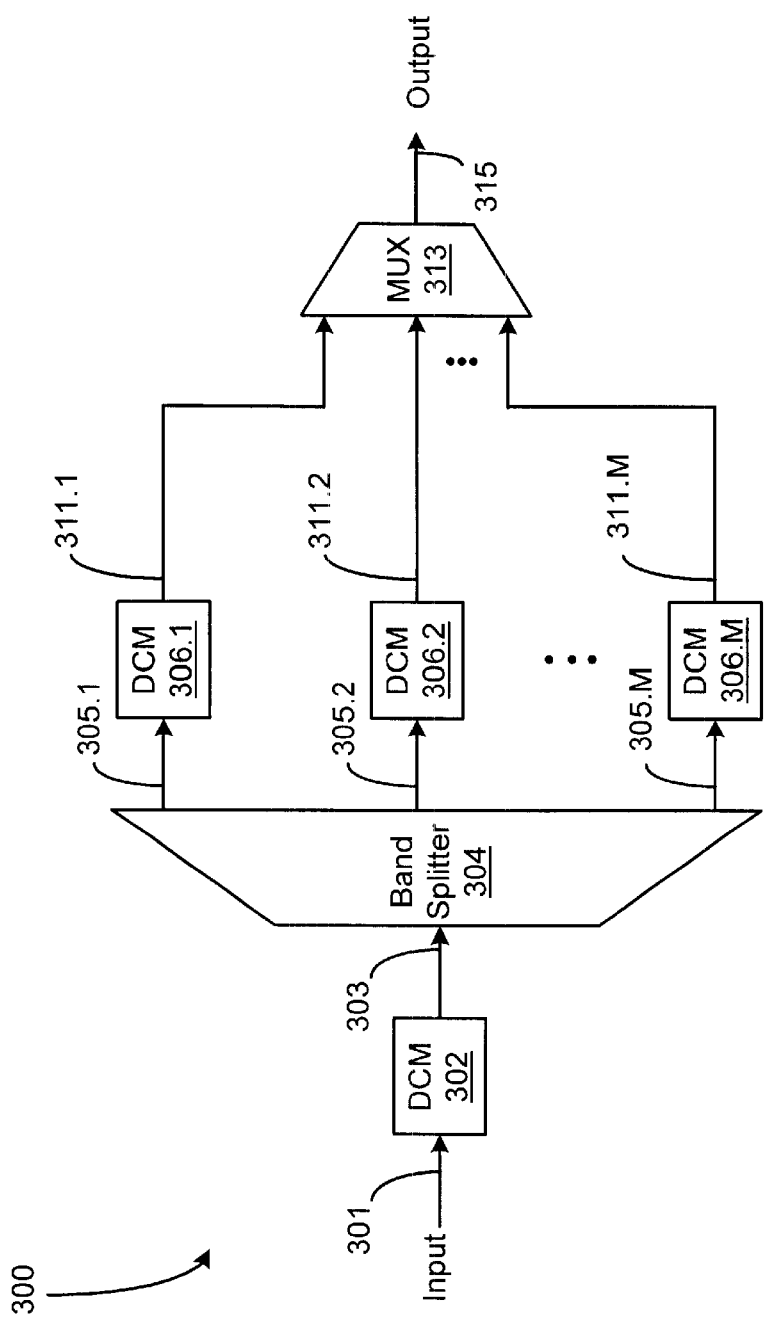
FIG. 3 is a block diagram depicting an all-optical regenerating apparatus configured to provide per-band dispersion compensation with gap-free band structures at mid-points of an optical signal path of a high speed DWDM optical transmission system, in accordance with the present invention.

FIG. 3 depicts a block diagram of an illustrative embodiment of an all-optical regenerating apparatus 300 configured to provide per-band dispersion compensation with gap-free band structures at mid-points of an optical signal path of a high speed DWDM optical transmission system, in accordance with the present invention. Like the line terminating/regenerating apparatus 200 (see FIG. 2a) and the line terminating apparatus 260 (see FIG. 2c), the regenerating apparatus 300 provides for a reduced fiber dispersion limit in a high speed DWDM optical transmission system by performing per-band dispersion compensation on a multi-wavelength optical signal having a gap-free band structure.

The regenerating apparatus 300 includes a DCM 302 configured to receive a multi-wavelength optical input signal by way of a transmission fiber 301, and provide a dispersion-compensated optical signal to a transmission fiber 303. The DCM 302 is configured to compensate for the effects of accumulated dispersion caused by fiber dispersion and non-linearity in the optical input signal. For example, the DCM 302 may comprise a dispersion compensation fiber, a fiber Bragg grating, or any other device capable of compensating accumulated dispersion caused by, e.g., fiber dispersion and non-linearity.

Because nonzero dispersion slopes may cause component wavelengths of the optical input signal to be subject to different dispersion values in the transmission fiber 301 and the DCM 302, different levels of residual dispersion may accumulate for at least some of the component wavelengths of the optical input signal.

For this reason, DCM 302 provides the optical signal to a band splitter 304 configured to separate the optical signal into a plurality of its component bands such that no band gaps are formed between adjacent bands. Further, the band splitter 304 provides the component bands to respective DCM's 306.1–306.M configured to compensate the residual dispersion contained in the bands on a per-band basis. Like the DCM's 206.1–206.M (see FIG. 2a), the DCM's 306.1–306.M are preferably adjustable to provide desired levels of dispersion compensation to maintain the residual dispersion in each band within a predetermined target window.

The DCM's 306.1–306.M provide the dispersion-compensated bands to an optical multiplexor 313 configured to receive the bands and provide a multi-wavelength optical signal comprising the component bands to a transmission fiber 315 for subsequent transmission.

Figure 4:
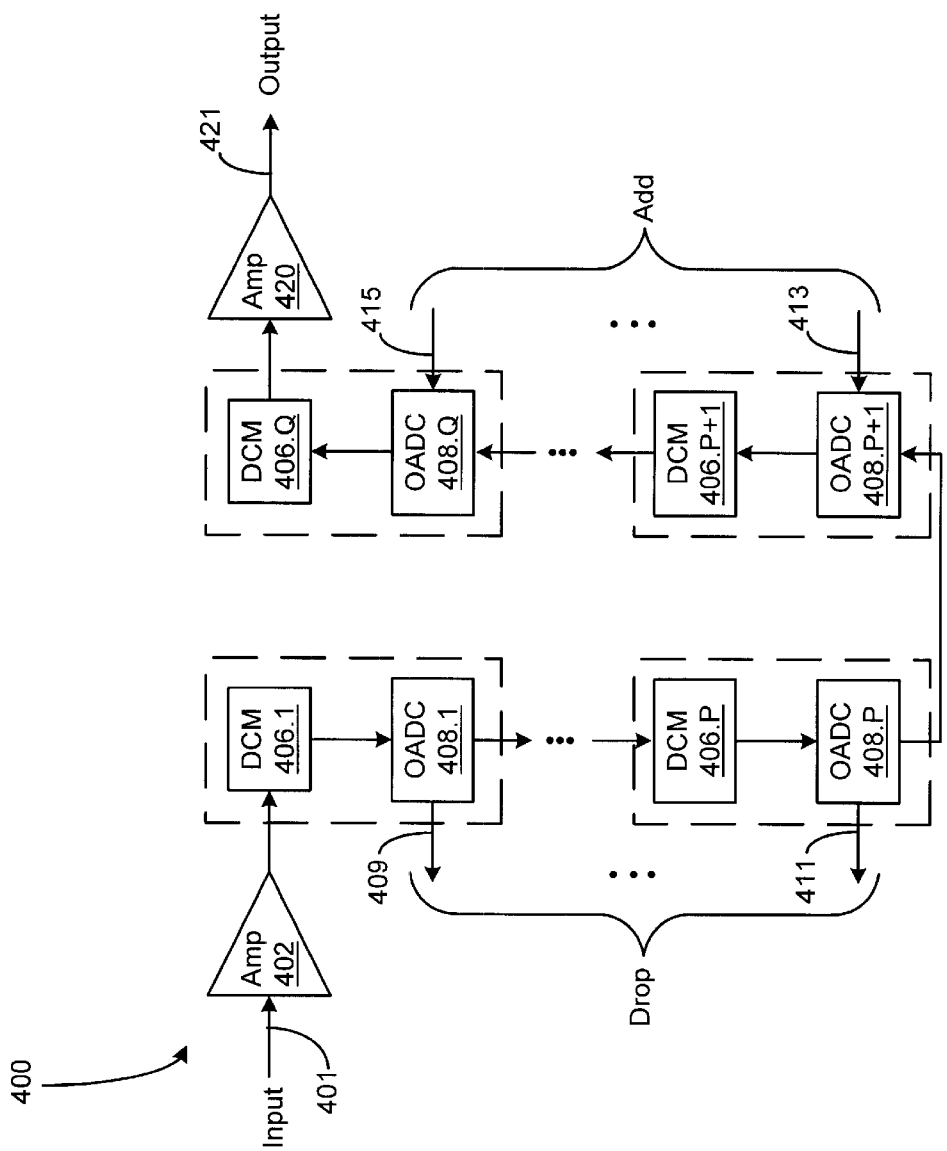
FIG. 4 is a block diagram depicting an optical add/drop apparatus of a high speed DWDM optical transmission system, in accordance with the present invention.

FIG. 4 depicts a block diagram of an illustrative embodiment of an optical add/drop apparatus 400 configured to reduce a fiber dispersion limit in a high speed DWDM optical transmission system by performing per-band dispersion compensation on a multi-wavelength optical signal.

The add/drop apparatus 400 includes an optical pre-amplifier 402 configured to receive an optical input signal comprising a single band (or a limited number of bands) by way of a transmission fiber 401, compensate for losses introduced by the transmission fiber 401, and provide the amplified optical signal to a DCM 406.1, which is coupled to the input of an optical add/drop device 408.1. The DCM 406.1 is configured to compensate residual dispersion contained in the band. In a preferred embodiment, the DCM 406.1 is adjustable to provide a desired level of dispersion compensation to maintain the residual dispersion in the band within a predetermined target window. The DCM 406.1 then provides the dispersion-compensated band to the add/drop device 408.1, which provides wavelengths that are dropped from the band ("dropped traffic") to a transmission fiber 409, and further provides "through traffic" to a DCM 406.P, which is coupled to the input of an optical add/drop device 408.P.

The DCM 406.P is preferably adjustable to provide a desired level of dispersion compensation to maintain the residual dispersion in the band (minus the dropped traffic) within the predetermined target window. The DCM 406.P then provides the dispersion-compensated through traffic to the add/drop device 408.P, which may provide dropped traffic to a transmission fiber 411, and further provides the through traffic to an optical add/drop device 408.P+1.

The add/drop device 408.P+1 is configured to receive wavelengths that are to be added within the band ("added traffic") by way of a transmission fiber 413, and provides the through traffic (including the added traffic) to a DCM 406.P+1 coupled to the output of the add/drop device 408.P+1.

The DCM 406.P+1 is preferably adjustable to provide a desired level of dispersion compensation to maintain the residual dispersion in the band (including the added traffic) within the predetermined target window. The DCM 406.P+1 then provides the dispersion-compensated through traffic to an optical add/drop device 408.Q, which may receive added traffic via a transmission fiber 415, and provides the through traffic to a DCM 406.Q coupled to the output of the add/drop device 408.Q.

The DCM 406.Q is also preferably adjustable to provide a desired level of dispersion compensation to maintain the residual dispersion in the band within the predetermined target window. The DCM 406.Q then provides the dispersion-compensated through traffic to an optical post-amplifier 420 configured to compensate for losses introduced by the transmission path comprising the DCM's 406.1–406.Q and the add/drop devices 408.1–408.Q. The post-amplifier 420 then provides the amplified band to a transmission fiber 421 for subsequent transmission.

The pre-amplifier 402 and the post-amplifier 420 may comprise respective EDFA's; and, the DCM's 406.1–406.Q may comprise respective dispersion compensation fibers, fiber Bragg gratings, or any other device capable of compensating for fiber dispersion.

It should be appreciated that the disclosed apparatus and methods for providing per-band dispersion compensation with gap-free band structures can be employed for fine-tuning chromatic dispersion to meet strict dispersion tolerance requirements in very high speed DWDM optical transmission systems capable of handling bit rates of, e.g., 40 Gb/s or more. The disclosed apparatus and methods also facilitate in-service upgrades of DWDM optical transmission systems to, e.g., incorporate new bands or remove unneeded bands, and/or optimize dispersion maps associated with respective channels by, e.g., suitably modifying dispersion levels at optical amplification and per-band dispersion compensation sites. Such modification of dispersion levels can also be employed to reduce power requirements at these sites in a DWDM optical transmission system.

It should also be appreciated that because the DCM's included in the line terminating/regenerating apparatus 200 (see FIG. 2a), the line terminating apparatus 260 (see FIG. 2c), the regenerating apparatus 300 (see FIG. 3), and the optical add/drop apparatus 400 (see FIG. 4) are employed to provide per-band dispersion compensation to compensate residual dispersion within the spectral range of each band, the requirements and cost of the DCM's are substantially reduced.

It will further be appreciated by those of ordinary skill in the art that modifications to and variations of the above-described apparatus and method may be made without departing from the inventive concepts disclosed herein. Accordingly, the invention should not be viewed as limited except as by the scope and spirit of the appended claims.

What is claimed is:

1. An optical transmission system, comprising:
   a transmitting device configured to transmit at least one multi-wavelength optical signal;
   a receiving device configured to receive the at least one multi-wavelength optical signal; and
   an optical transmission path interconnecting the transmitting device and the receiving device and configured to carry the at least one multi-wavelength optical signal,
   wherein the optical transmission path includes
      a band splitting device configured to receive a first multi-wavelength optical signal and to split the first optical signal into a plurality of bands of component wavelengths, each band comprising at least one wavelength, and
      a first dispersion compensating device configured to receive the plurality of bands of component wavelengths and to compensate dispersion contained in each band.

2. The optical transmission system of claim 1 wherein the dispersion contained in each band comprises wavelength-dependent residual dispersion.

3. The optical transmission system of claim 1 wherein there are no band gaps between adjacent bands in the plurality of bands.

4. The optical transmission system of claim 1 wherein the optical transmission path further includes a second dispersion compensating device configured to receive a second multi-wavelength optical signal, to compensate for effects of optical fiber dispersion and non-linearity in a refractive index of optical fiber in the second optical signal to generate the first optical signal, and to provide the first optical signal to the band splitting device.

5. The optical transmission system of claim 4 wherein the first optical signal provided to the band splitting device by the second dispersion compensating device contains wavelength-dependent residual dispersion.

6. The optical transmission system of claim 1 wherein the optical transmission path further includes a plurality of optical de-multiplexors configured to receive the respective bands, and to separate the respective bands into their component wavelengths.

7. The optical transmission system of claim 1 wherein the optical transmission path further includes at least one optical multiplexor configured to receive the respective bands, and to combine the respective bands into a third multi-wavelength optical signal.

8. The optical transmission system of claim 1 wherein the band splitting device includes a 50/50 optical coupler configured to receive the first optical signal and to provide the first optical signal to a first optical path and a second optical path, the first optical path including a first group of band filters, and the second optical path including a second group of band filters.

9. The optical transmission system of claim 8 wherein the first group of band filters is configured to split the first optical signal into a plurality of even bands, and the second group of band filters is configured to split the first optical signal into a plurality of odd bands, there being no band gaps between adjacent bands of the pluralities of odd and even bands.

10. The optical transmission system of claim 1 wherein the first dispersion compensating device includes a plurality of dispersion compensating modules configured to compensate residual dispersion contained in the respective bands.

11. A method of transmitting a multi-wavelength optical signal through an optical transmission system, the system including a transmitting device configured to transmit at least one multi-wavelength optical signal, a receiving device configured to receive the at least one multi-wavelength optical signal, and an optical transmission path interconnecting the transmitting device and the receiving device and configured to carry the at least one multi-wavelength optical signal, the method comprising the steps of:

transmitting a first multi-wavelength optical signal along the optical transmission path by the transmitting device;

receiving the first optical signal by a band splitting device included in the optical transmission path;

splitting the first optical signal to obtain a plurality of bands of component wavelengths by the band splitting device, each band comprising at least one wavelength; and compensating dispersion contained in each band by a first dispersion compensating device included in the optical transmission path.

12. The method of claim 11 wherein the dispersion compensated in the compensating step comprises wavelength-dependent residual dispersion.

13. The method of claim 11 wherein the plurality of bands obtained in the splitting step comprises no band gaps between adjacent bands.

14. The method of claim 11 further including the step of compensating effects of optical fiber dispersion and non-linearity in a refractive index of optical fiber in a second optical signal to generate the first optical signal by a second dispersion compensating device included in the optical transmission path.

15. An optical transmission system, comprising:

a transmitting device configured to transmit at least one multi-wavelength optical signal;

a receiving device configured to receive the at least one multi-wavelength optical signal; and an optical transmission path interconnecting the transmitting device and the receiving device and configured to carry the at least one multi-wavelength optical signal, wherein the optical transmission path includes at least one first optical add/drop device configured to receive a multi-wavelength optical signal and to provide at least one wavelength dropped from the optical signal, at least one second optical add/drop device configured to receive at least one wavelength that is to be added to the optical signal, and wherein the optical transmission path further includes respective dispersion compensating devices coupled at an input of the first optical add/drop device and an output of the second optical add/drop device and configured to compensate dispersion contained in the optical signal.

16. The optical transmission system of claim 15 wherein the dispersion contained in the optical signal comprises wavelength-dependent residual dispersion.

17. The optical transmission system of claim 15 wherein the optical signal comprises at least one band, the band including at least one component wavelength.

18. The optical transmission system of claim 15 wherein the optical signal comprises a plurality of bands of component wavelengths, there being no band gaps between adjacent bands.

19. A method of providing in-service upgrades of an optical transmission system, the system including a transmitting device configured to transmit at least one multi-wavelength optical signal, a receiving device configured to receive the at least one multi-wavelength optical signal, and an optical transmission path interconnecting the transmitting device and the receiving device and configured to carry the at least one multi-wavelength optical signal, the multi-wavelength optical signal including a plurality of bands of component wavelengths, the method comprising the steps of:

in the event a first band of wavelengths is to be added to the plurality of bands carried by the optical transmission path, configuring a band splitting device included in the optical transmission path to provide the first band, and configuring a first dispersion compensating device in the optical transmission path to compensate dispersion in the first band; and in the event a second band of wavelengths is to be dropped from the plurality of bands carried by the optical transmission path, configuring the band splitting device to cease providing the second band, and configuring a second dispersion compensating device in the optical transmission path to cease compensating dispersion in the second band.

20. The method of claim 19 wherein the dispersion contained in the first and second bands compensated by the first and second dispersion compensating devices comprises wavelength-dependent residual dispersion.

21. The method of claim 19 wherein there are no band gaps in the plurality of bands included in the multi-wavelength optical signal.

22. An optical transmission system, comprising:

a transmitting device configured to transmit at least one multi-wavelength optical signal;

a receiving device configured to receive the at least one multi-wavelength optical signal; and an optical transmission path interconnecting the transmitting device and the receiving device and configured to carry the at least one multi-wavelength optical signal, wherein the optical transmission path includes a first dispersion compensating device configured to receive a plurality of wavelength bands of a first multi-wavelength optical signal and to compensate dispersion contained in each band, each band comprising at least one wavelength, and a band combining device configured to receive the plurality of dispersion-compensated bands, and to combine the plurality of bands to generate a second multi-wavelength optical signal.

23. The optical transmission system of claim 22 wherein the dispersion contained in each band comprises wavelength-dependent residual dispersion.

24. The optical transmission system of claim 22 wherein there are no band gaps between adjacent bands in the plurality of bands.

25. The optical transmission system of claim 22 wherein the optical transmission path further includes a second dispersion compensating device configured to receive the second multi-wavelength optical signal, and to compensate for effects of optical fiber dispersion and non-linearity in a refractive index of optical fiber in the second optical signal.

26. The optical transmission system of claim 22 wherein the optical transmission path further includes a plurality of optical multiplexors configured to receive respective component wavelength bands, and to combine the respective component wavelength bands to generate the plurality of wavelength bands of the first multi-wavelength optical signal.

27. The optical transmission system of claim 22 wherein the band combining device includes a first group of band filters in a first optical path, a second group of band filters in a second optical path, the first and second groups of band filters being configured to receive and filter the respective dispersion-compensated bands, and a 50/50 optical coupler configured to receive the respective filtered bands by way of the first and second optical paths and generate the second multi-wavelength optical signal comprising a combination of the respective filtered bands.

28. The optical transmission system of claim 27 wherein the respective dispersion-compensated bands received by the first group of band filters comprise a plurality of odd bands, and the respective dispersion-compensated bands received by the second group of band filters comprise a plurality of even bands.

29. The optical transmission system of claim 22 wherein the first dispersion compensating device includes a plurality of dispersion compensating modules configured to compensate dispersion contained in the respective bands.

30. A method of transmitting a multi-wavelength optical signal through an optical transmission system, the system including a transmitting device configured to transmit at least one multi-wavelength optical signal, a receiving device configured to receive the at least one multi-wavelength optical signal, and an optical transmission path interconnecting the transmitting device and the receiving device and configured to carry the at least one multi-wavelength optical signal, the method comprising the steps of:

transmitting a plurality of bands of component wavelengths of a first multi-wavelength optical signal along the optical transmission path by the transmitting device, each band comprising at least one wavelength;

receiving the plurality of bands of component wavelengths by a dispersion compensating device included in the optical transmission path;

compensating dispersion contained in each band by the dispersion compensating device; and combining the plurality of dispersion-compensated bands to obtain a second multi-wavelength optical signal by a band combining device included in the optical transmission path.

31. The method of claim 30 wherein the dispersion compensated in the compensating step comprises wavelength-dependent residual dispersion.

32. The method of claim 30 wherein the plurality of bands transmitted in the transmitting step comprises no band gaps between adjacent bands.

* * * * *